(12) United States Patent
Sonobe

(10) Patent No.: US 8,879,281 B2
(45) Date of Patent: Nov. 4, 2014

(54) SWITCHING POWER SOURCE DEVICE

(71) Applicant: Fuji Electric Co., Ltd., Kawasaki (JP)

(72) Inventor: Koji Sonobe, Matsumoto (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 0 days.

(21) Appl. No.: 14/021,453

(22) Filed: Sep. 9, 2013

(65) Prior Publication Data

US 2014/0078787 A1    Mar. 20, 2014

(30) Foreign Application Priority Data

Sep. 20, 2012  (JP) ................. 2012-206963

(51) Int. Cl.
*H02M 3/335* (2006.01)
*H02M 1/38* (2007.01)

(52) U.S. Cl.
CPC .......... *H02M 3/33515* (2013.01); *H02M 3/335* (2013.01)
USPC ...... 363/21.03; 363/21.02; 323/238

(58) Field of Classification Search
CPC ............... H02M 2001/38; H02M 1/38
USPC ........... 323/271, 282–285, 351, 238, 901; 363/21.01–21.18, 49
See application file for complete search history.

(56) References Cited

U.S. PATENT DOCUMENTS

| | | | | |
|---|---|---|---|---|
| 6,614,208 | B2 * | 9/2003 | Narita ........................ | 323/283 |
| 2008/0278984 | A1 * | 11/2008 | Stanley ...................... | 363/95 |
| 2011/0012577 | A1 * | 1/2011 | Wang et al. ................ | 323/283 |
| 2012/0032657 | A1 * | 2/2012 | Dequina .................... | 323/271 |

FOREIGN PATENT DOCUMENTS

| | | | |
|---|---|---|---|
| JP | 2005-051918 | A | 2/2005 |
| JP | 2010-004596 | A | 1/2010 |

* cited by examiner

*Primary Examiner* — Timothy J Dole
*Assistant Examiner* — Ivan Laboy Andino
(74) *Attorney, Agent, or Firm* — Manabu Kanesaka

(57) ABSTRACT

A switching power source device IS capable of guaranteeing a normal switching operation even when the input of a coil voltage used for adjusting a dead time is eliminated. The switching power source device includes a dead time adjustment circuit that generates an ON trigger signal that regulates an ON timing of one of the first and second switching elements after elapse of a predetermined dead time from an OFF timing of the other switching element and that adjusts the dead time according to a temporal change of a terminal voltage detected from an auxiliary coil of an inductor; and a disable control circuit that detects a temporal change of the coil voltage during activation and disables a function of the dead time adjustment circuit adjusting the dead time when the coil voltage does not temporally change.

4 Claims, 4 Drawing Sheets

SWITCHING POWER SOURCE DEVICE

RELATED APPLICATIONS

The present application claims priority from Japanese Application No. 2012-206963 filed Sep. 20, 2012.

BACKGROUND

1. Technical Field

The present invention relates a switching power source device that has first and second switching elements subjected to on/off-driving alternately and that has a function of adjusting a dead time width that regulates the turn-on timing of the first and second switching elements.

2. Related Art

As schematically illustrated in FIG. 4, for example, a resonance-type switching power source device includes a first switching element Q1 connected in series to a primary coil T1 of an insulation transformer T and a second switching element Q2 connected in series to the first switching element Q1 and connected in parallel to the primary coil T1 of the insulation transformer T. The first switching element Q1 switches an input voltage Vi applied through an input capacitor Ci and electric power is accumulated in a leakage inductor of the insulation transformer T. Electric power accumulated in the inductor by switching the second switching element Q2 is transferred from secondary coils S1 and S2 of the insulation transformer T to an output capacitor Co using resonance of the inductor, and thereby an output voltage Vo is obtained (for example, see Patent Documents 1 and 2).

The first and second switching elements Q1 and Q2 are formed from power transistors such as a high-withstand voltage MOSFET or IGBT, for example. Moreover, in FIG. 4, a resonance capacitor Cr is a resonance capacitor connected in series to the primary coil T1 of the insulation transformer T. A voltage generated between the secondary coils S1 and S2 of the insulation transformer T is rectified by rectification diodes Da and Db and is transferred to the output capacitor Co. Moreover, the switching elements Q1 and Q2 include body diodes D1 and D2.

The switching operation of the first and second switching elements Q1 and Q2 is controlled basically as follows. An error detector 1 detects the output voltage Vo obtained in the output capacitor Co, and the output voltage Vo is fed back to an oscillator 2 that regulates a switching frequency of the switching elements Q1 and Q2. The oscillator 2 performs a role of outputting an OFF trigger signal Off_trg in response to a feedback signal (an error signal between a preset output voltage and an output power Vo) from the error detector 1 at a timing that occurs a predetermined period that regulates the ON width of the switching elements Q1 and Q2, later than the input timing of an ON trigger signal On_trg to be described later.

The control circuit 3 alternately generates driving signals Lo and Ho for turning on the first and second switching elements Q1 and Q2, respectively, according to the ON trigger signal On_trg and the OFF trigger signal Off_trg and drives a driver circuit 4 using these driving signals Lo and Ho to turn on the first and second switching elements Q1 and Q2.

The ON trigger signal On_trg used for generating the driving signals Lo and Ho is generated by a dead time adjustment circuit 5 that inputs the OFF trigger signal Off_trg. This dead time adjustment circuit 5 performs a role of adjusting the timing at which one of the switching elements Q1 and Q2 is turned on after the other of the switching elements Q1 and Q2 is turned off. Specifically, the dead time adjustment circuit 5 generates the ON trigger signal On_trg at a timing that occurs a predetermined delay time (the dead time Tdead) later than the input timing of the OFT trigger signal Off_trg. The dead time Tdead is set based on the time required for a voltage VS applied to the switching elements Q1 and Q2 to reach zero (0 V) due to a current flowing through the body diodes D1 and D2 in response to the turn-off of the switching elements Q1 and Q2.

However, the time (turn-off rise/fall time) required for the voltage VS to reach zero (0 V) in response to the turn-off of the switching elements Q1 and Q2 changes depending on a parasitic capacitance of the switching elements Q1 and Q2 and a resonance current flowing through the inductor. Specifically, the turn-off rise/fall time of the switching elements Q1 and Q2 increases in a light load state in which the resonance current is small. Conversely, the turn-off rise/fall time of the switching elements Q1 and Q2 decreases in a heavy load state where the resonance current is large. That is, the timing at which the voltage VS reaches zero (0 V) changes depending on a load state.

Therefore, conventionally, the bottom (peak) of the voltage VS generated due to the resonance current of the inductor in response to the turn-off of the switching element Q1 (Q2), for example, is detected from a coil voltage Vp2 generated in the auxiliary coil T2 of the insulation transformer T, and the dead time Tdead is adjusted according to the detection result. Specifically, a dV/dt detector 6 differentiates the coil voltage Vp2 generated in the auxiliary coil T2 of the insulation transformer T and detects the timing at which the polarity of the differential value is reversed as the timing of the bottom (peak) of the voltage generated due to the resonance current. The dead time adjustment circuit 5 automatically adjusts the dead time Tdead according to the timings P2L and P2H detected by the dV/dt detector 6.

The dead time Tdead is adjusted to be between a smallest dead time for preventing simultaneous turnon of the first and second switching elements Q1 and Q2 in a heavy load state and a largest dead time for forcibly restarting the switching operation in a light load state or when it is not possible to detect the reversal of the polarity of the coil voltage Vp2.

Patent Document 1: Japanese Patent Publication No. 2005-51918

Patent Document 2: Japanese Patent Publication No. 2010-4596

SUMMARY

Problem to be Solved of the Invention

Depending on the purpose of this type of switching power source device, there is a case in which the switching power source device can be used for a heavy load only. In this case, the rise (fall) time of the voltage VS is always shorter than the smallest dead time Tdead. Due to this, the dead time adjustment circuit 5 always outputs the ON trigger signal On_trg at the timing that occurs the smallest dead time Tdead later than the input timing of the OFF trigger signal Off_trg in order to prevent simultaneous turn-on of the first and second switching elements Q1 and Q2. Thus, in this case, the automatic adjustment of dead time itself is not necessary.

However, if the auxiliary coil T2 of the insulation transformer T, for example, is eliminated to simplify the configuration of the insulation transformer T and the input of the coil voltage Vp2 to the dV/dt detector 6 is eliminated due to the reason that the automatic adjustment of the dead time Tdead for the heavy load purpose is not necessary, it is not possible to detect the voltage VS. Specifically, a detection terminal VW of the coil voltage Vp2 is always pulled up to an internal power voltage, and the dV/dt detector 6 erroneously detects that this state is a light load state.

As a result, the dead time adjustment circuit 5 always generates the ON trigger signal On_trg at the timing generated after the largest dead time Tdead. If the voltage of the feedback signal increases with a decrease of the output voltage Vo in response to a heavy load state, the oscillator 2 operates so that the switching frequency of the switching elements Q1 and Q2 decreases further. As a result, it is not possible to maintain the switching operation based on the current resonance, and the switching power source device does not function properly.

Means to Solve the Problem

The present invention is directed to provide a switching power source device capable of guaranteeing a normal switching operation even when an auxiliary coil is removed from the insulation transformer and the input of the coil voltage Vp2 to the dV/dt detector is eliminated due to the reasons that automatic adjustment of the dead time is not necessary.

According to one aspect of the present invention, a switching power source device includes: a resonance-type switching power source device main body which includes first and second switching elements that are connected in series and are alternately subjected to on/off-driving, and in which the first switching element switches an input voltage to accumulate electric power in an inductor, the second switching element is switched to transfer the electric power accumulated in the inductor to an output capacitor using resonance of the inductor to obtain output electric power; a dead time adjustment circuit that generates an ON trigger signal that regulates an ON timing of one of the first and second switching elements after elapse of a predetermined dead time from an OFF timing of the other switching element and that adjusts the dead time according to a temporal change of a terminal voltage input to an input terminal for detecting a change in a connection point voltage of the first and second switching elements; and a disable control circuit that detects a temporal change of the terminal voltage during activation and disables a function of the dead time adjustment circuit adjusting the dead time when the terminal voltage does not temporally change.

The resonance-type switching power source device main body has a configuration in which the first switching element is connected in series to a primary coil of an insulation transformer and the second switching element is connected in parallel to the primary coil of the insulation transformer, and the terminal voltage input to the voltage detection terminal is a voltage generated in an auxiliary coil of the insulation transformer. Moreover, the terminal voltage during the activation is detected as a voltage before the first and second switching elements starts a switching operation.

Preferably, the disable control circuit includes a comparator that compares the connection point voltage of the first and second switching elements during the activation, for example, with a reference voltage generated based on an internal power voltage and a flip-flop that maintains the output of the comparator to enable or disable the operation of adjusting the dead time.

According to the switching power source device, when the voltage generated in the auxiliary coil of the insulation transformer is not input to the input terminal of the dead time adjustment circuit, it is not possible to detect a temporal change of the connection point voltage of the first and second switching elements during activation from the coil voltage. However, conversely, since the input terminal is pulled up to the internal power voltage, for example, and the terminal voltage does not change, it is possible to detect that there is no input of the coil voltage to the input terminal. Moreover, the function of the dead time adjustment circuit adjusting the dead time is disabled when the input of the coil voltage is not present, and the dead time is set to a smallest dead time width.

As a result, the dead time adjustment function of the dead time adjustment circuit is not performed so that the dead time is set to be longer than the smallest dead time, and the first and second switching elements are turned on after the elapse of the smallest dead time corresponding to the heavy load. Therefore, even when the coil voltage is not input, it is possible to prevent the occurrence of a case in which the load state is detected erroneously to turn on/off the first and second switching elements. As a result, the operation of the switching power supply using current resonance can be performed properly.

DETAILED DESCRIPTION

Hereinafter, a switching power source device according to an embodiment of the present invention will be described with reference to the drawings.

Figure 4:
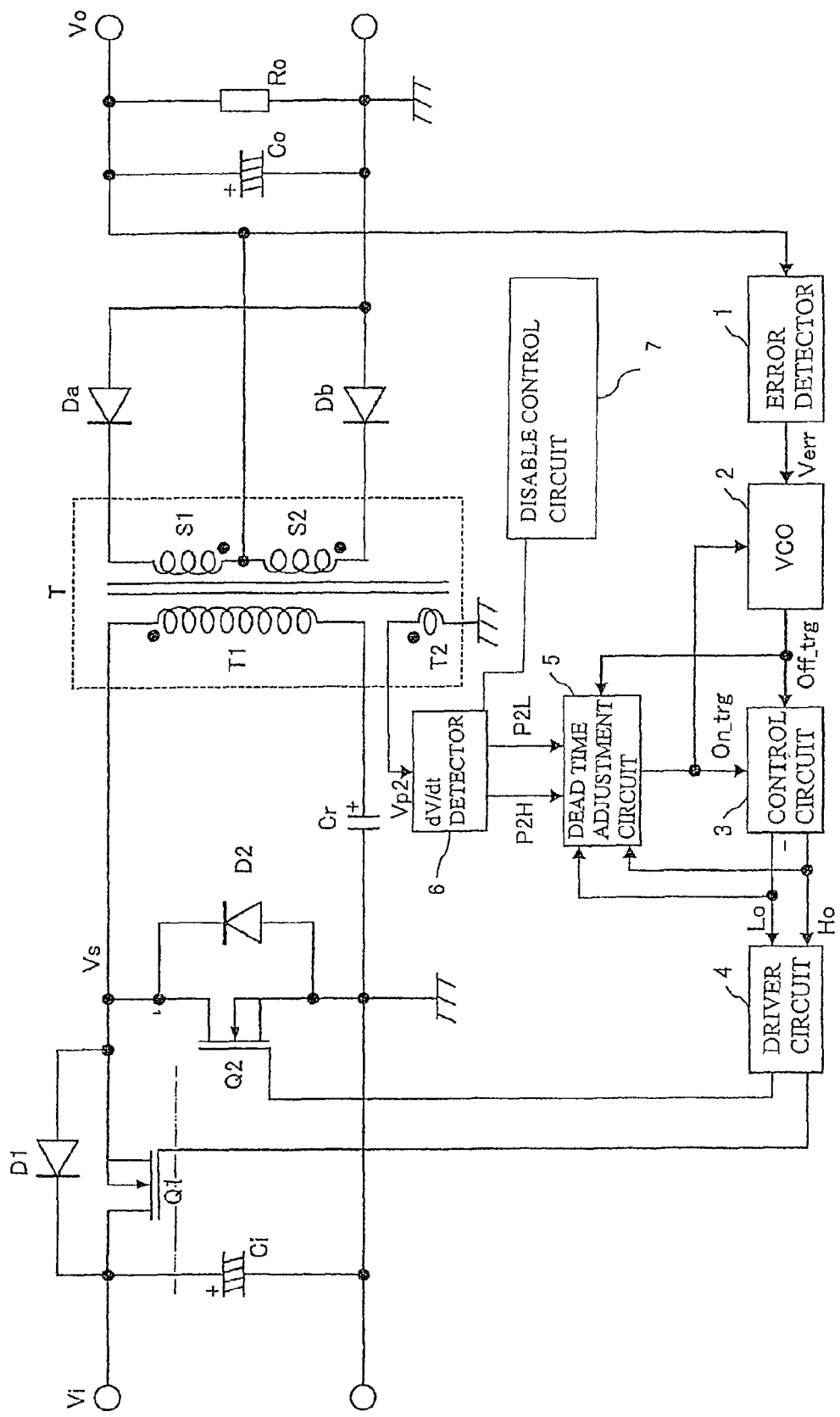
FIG. 4 is a diagram illustrating an overall configuration of a switching power source device.

As schematically illustrated in FIG. 4, the switching power source device includes a switching power source device main body that includes a first switching element Q1 connected in series to a primary coil T1 of an insulation transformer. T, a second switching element Q2 connected in series to the first switching element Q1 and connected in parallel to the primary coil T1 of the insulation transformer T, and an output capacitor Co connected to secondary coils S1 and S2 of the insulation transformer T through rectification diodes Da and Db.

As described above, the switching power source device main body alternately switches on/off the first and second switching elements Q1 and Q2 to convert an input voltage Vi applied through an input capacitor Ci into electric power using the insulation transformer T using current resonance between an inductor of the insulation transformer T and a resonance capacitor Cr, transfers the electric power to the output capacitor Co to obtain an output voltage Vo. Specifically, the switching power source device main body turns on the first switching element Q1 to accumulate the electric power in a leakage inductor of the insulation transformer T, and then, turns on the second switching element Q2 to transfer the electric power accumulated in the inductor from the secondary coils S1 and S2 of the insulation transformer T to the output capacitor. Co to obtain the output voltage Vo.

Moreover, the switching power source device main body includes a controller that alternately switches on/off the first and second switching elements Q1 and Q2. The controller includes the oscillator 2, the control circuit 3, the driver circuit 4, the dead time adjustment circuit 5, and the dV/dt detector 6 illustrated in FIG. 4. The controller is configured as a switching power supply control integrated circuit (IC), for example. Information on the output voltage Vo detected by the error detector 1 (for example, a voltage difference between a preset output voltage regulated according to specifications and the output voltage Vo obtained in the output capacitor Co) is fed back to the controller (IC) via a photocoupler (not illustrated) and is used for controlling the oscillation frequency of the oscillator 2.

The switching power source device according to the present invention includes a disable control circuit 7 that detects a temporal change in the connection point voltage VS of the first and second switching elements Q1 and Q2 during activation, in particular, from a temporal change in the coil voltage Vp2 generated in the auxiliary coil T2 of the insulation transformer T and disables the operation of the dead time adjustment circuit 5 adjusting the dead time when the connection point voltage VS (the coil voltage Vp2) does not temporally change. For example, the disable control circuit 7 is configured as a circuit that is associated with the dV/dt detector 6 as illustrated in FIG. 1 illustrating the dV/dt detector 6 and a schematic configuration thereof.

Figure 1:
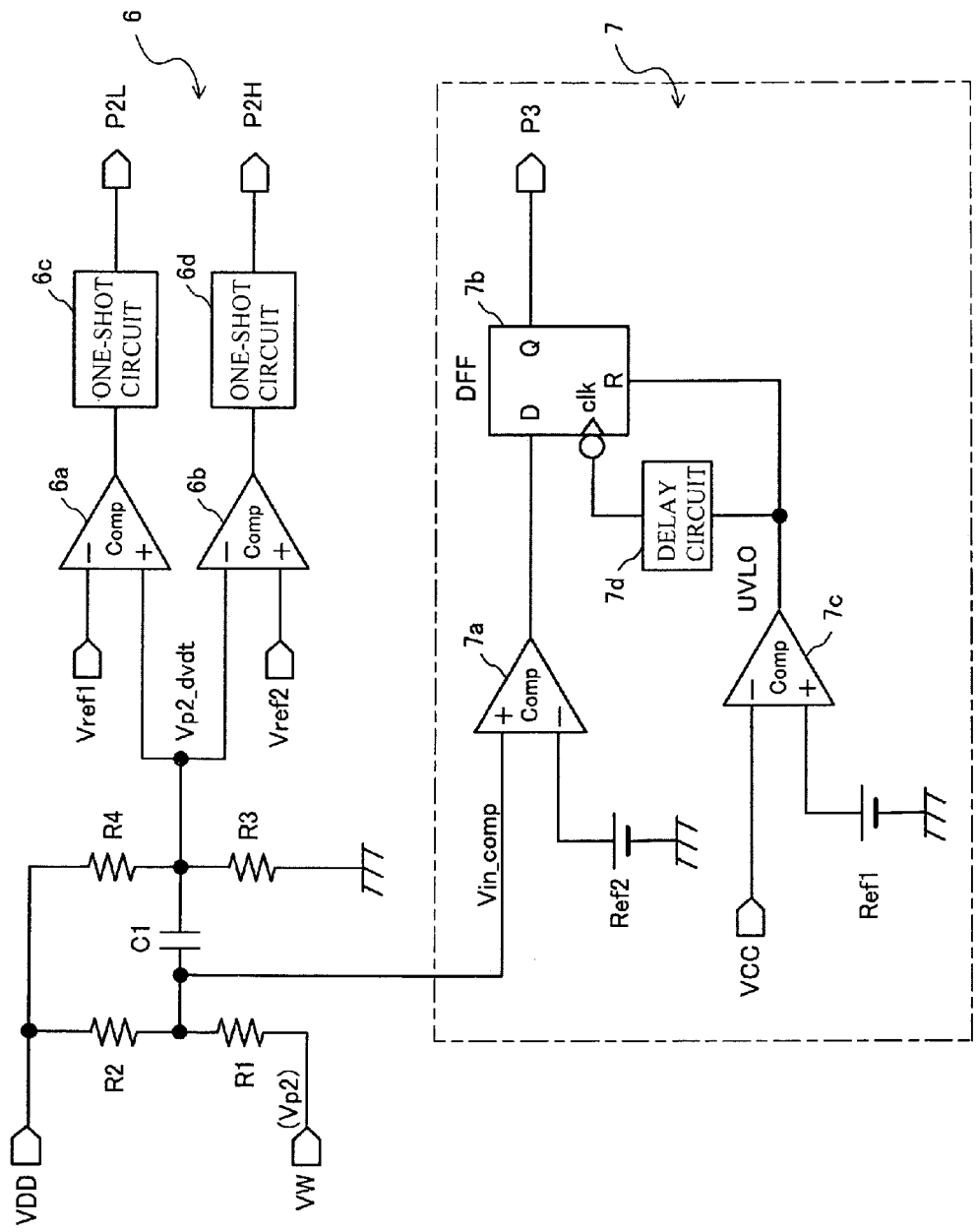
FIG. 1 is a diagram illustrating a schematic configuration of a dV/dt detection circuit of a switching power source device according to an embodiment of the present invention and a disable control circuit associated with the dV/dt detection circuit.

That is, as illustrated in FIG. 1, the dV/dt detector 6 includes a differentiating circuit that differentiates the coil voltage Vp2 that is input from the terminal VW for detecting a temporal change in the connection point voltage VS (the coil voltage Vp2) via a resistor R1 and that is pulled up by an internal power voltage VDD via a resistor R2. The differentiating circuit includes a capacitor C1 and resistors R3 and R4. The resistors R1 and R2 have the same resistance values, for example, and perform a role of shifting the coil voltage Vp2 input through the terminal VW to a voltage signal that is around an half of the internal power voltage VDD. Due to these resistors R1 and R2, the coil voltage Vp2 wherein the polarity changes from positive to negative is converted to a voltage signal that changes in the range of constant voltages around the half of the internal power voltage VDD and is differentiated by the capacitor C1 and the resistors R3 and R4.

The dV/dt detector 6 includes two comparators 6a and 6b that are provided in parallel to compare the differential value of the coil voltage Vp2 obtained by the differentiating circuit with reference threshold values Vref1 and Vref2. The reference threshold value Vref1 is set to ¼ of the internal power voltage VDD, for example, and the reference threshold value Vref2 is set to ¾ of the internal power voltage VDD, for example. The comparator 6a inverts its output when the differential value of the coil voltage Vp2 exceeds the reference threshold value Vref1 and activates an one-shot circuit 6c to generate a pulse signal P2L of a predetermined width (for example, 50 ns). Moreover, the comparator 6b inverts its output when the differential value of the coil voltage Vp2 is smaller than the reference threshold value Vref2 and activates a one-shot circuit 6d to generate a pulse signal P2H of a predetermined width (for example, 50 ns).

The coil voltage Vp2 changes with a current flowing through the insulation transformer T according to the switching operation of the switching elements Q1 and Q2. The rate of change of the coil voltage Vp2 depends on the rise (fall) time during the turn on/off of the switching elements Q1 and Q2 and the rise (fall) time changes according to the load as described above. The pulse signals P2L and P2H generated in this manner are output at the timing when the coil voltage Vp2 generated with the switching of the first and second switching elements Q1 and Q2 reaches the reference threshold values Vref1 and Vref2 according to the rate of change of the coil voltage Vp2 that changes with the load after the coil voltage Vp2 reaches its bottom (peak) value (when the differential value is 0).

The disable control circuit 7 associated with the dV/dt detector 6 having such a configuration includes a first comparator 7a that compares the coil voltage Vp2 input via the resistor R1 as illustrated in FIG. 1, for example, with a reference voltage Ref2 generated based on the internal power voltage VDD, for example, and outputs a signal [H] when the coil voltage Vp2 exceeds the reference voltage Ref2 and a D-type flip-flop 7b that receives the output of the first comparator 7a at its data terminal. The D-type flip-flop 7b performs a role of enabling the function of the dead time adjustment circuit 5 automatically adjusting the dead time Tdead when the output is [L] and disabling the function of automatically adjusting the dead time Tdead when the output is [H].

Specifically, the D-type flip-flop 7b is reset according to the output of a second comparator 7c that compares the driving voltage VCC of the controller which is configured as an integrated circuit (IC) as described above, for example, with a preset reference voltage (operation guaranteeing voltage) Ref1. The D-type flip-flop 7b receives a signal obtained by delaying the output of the second comparator 7c via a delay circuit 7d as its clock and sets the output data of the first comparator 7a at the timing at which the clock is input thereto. The second comparator 7c may be a so-called undervoltage lockout (UVLO) comparator that outputs an undervoltage lockout signal when the driving voltage VCC is lower than the reference voltage (the operation guaranteeing voltage) Ref1, for example.

Figure 2:
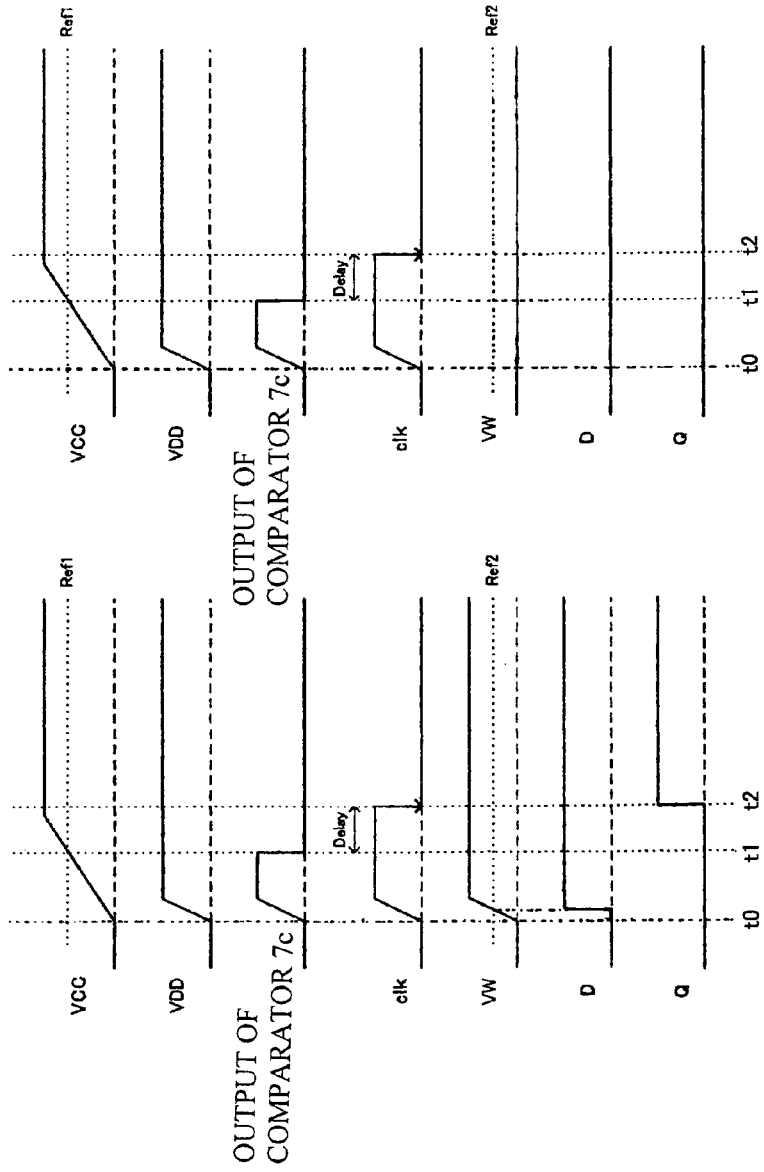
FIGS. 2A and 2B are timing diagrams illustrating the operation of the disable control circuit illustrated in FIG. 1.

The disable control circuit 7 having such a configuration operates according to the operation timing illustrated in FIGS. 2A and 2B. FIG. 2A illustrates the operation timing when the input terminal VW of the dV/dt detector 6 is open and the coil voltage Vp2 is not input to the input terminal VW. FIG. 2B illustrates the operation timing when the auxiliary coil T2 of the insulation transformer T is connected to the input terminal VW of the dV/dt detector 6 and the coil voltage Vp2 is input to the input terminal VW of the dV/dt detector 6.

However, when the power voltage VCC rises with the activation (timing "t0") of the switching power source device, and as a result, the internal power voltage VDD rises, the second comparator (ULVO) 7c maintains its output at [H] in an initial period until the internal power voltage VDD exceeds the reference voltage (the operation guaranteeing voltage) Ref1 and inverts its output to [L] at timing "t1" at which the internal power voltage VDD exceeds the reference voltage (the operation guaranteeing voltage) Ref1. The output of the second comparator 7c is delayed by the delay circuit 7d and is input to the D-type flip-flop 7b as a clock signal clk. The D-type flip-flop 7b reads the output of the first comparator 7a at the rise timing "t2" of the clock signal clk.

In this case, if the input-terminal VW of the dV/dt detector 6 is open, since the input terminal VW is pulled up to the internal power voltage VDD via the resistors R1 and R2, the voltage of the input terminal VW rises with the rise of the internal power voltage VDD as illustrated in FIG. 2A. When the voltage of the input terminal VW exceeds the reference voltage Ref2, the first comparator 7a inverts its output P3 to [H] and applies the inverted output to the data input terminal D of the D-type flip-flop 7b. As a result, the D-type flip-flop 7b receives the [H] level output of the first comparator 7a at the falling timing "t2" of the clock signal clk and inverts its output Q to the [H] level. The [H] level output of the first comparator 7a disables the function of the dead time adjustment circuit 5 automatically adjusting the dead time Tdead.

In contrast, if the auxiliary coil T2 is connected to the input terminal VW of the dV/dt detector 6 and the coil voltage Vp2 is applied to the input terminal VW, the voltage of the input terminal VW of the dV/dt detector 6 is maintained at zero (0 V) as illustrated in FIG. 2B before the switching elements Q1 and Q2 start the switching operation during the activation. As a result, the output P3 of the first comparator 7a is maintained at the [L] level, and the output of the D-type flip-flop 7b will not be inverted at the falling timing "t2" of the clock signal clk. That is, the output of the D-type flip-flop 7b is maintained at the [L] level, and the function of the dead time adjustment circuit 5 automatically adjusting the dead time Tdead is still enabled.

Next, the dead time adjustment circuit 5 wherein the function of automatically adjusting the dead time Tdead is enabled or disabled according to the output P3 of the disable control circuit 7 will be described.

Figure 3:
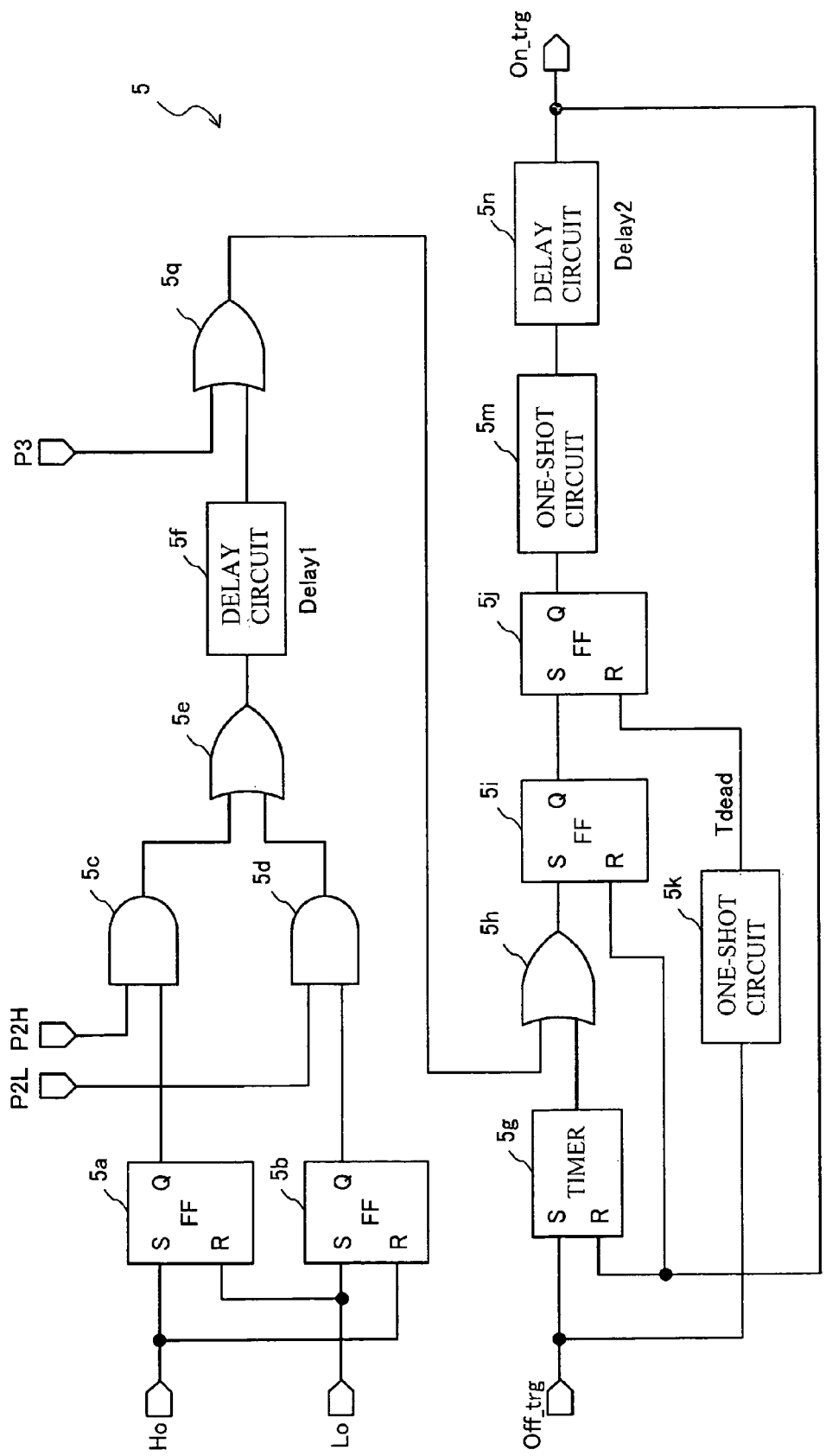
FIG. 3 is a diagram illustrating a schematic configuration of a dead time adjustment circuit of the switching power source device according to an embodiment of the present invention.

FIG. 3 illustrates a schematic configuration of the dead time adjustment circuit 5. The dead time adjustment circuit 5 includes flip-flops 5a and 5b that receive the driving signals Lo and Ho for the first and second switching elements Q1 and Q2, generated by the control circuit 3 and are set and reset reciprocally. These flip-flops 5a and 5b perform a role of specifying the switching element Q1 (Q2) to be in the ON state and selectively activating gate circuits 5c and 5d.

The gate circuits 5c and 5d selectively input the pulse signals P2H and P2L output by the dV/dt detector 6 to the switching element Q1 (Q2) which is in the OFF state in correlation. The pulse signals P2H and P2L selectively input through the gate circuits 5c and 5d are input to a delay circuit 5f via an OR circuit 5e and output with a predetermined delay period Delay1.

On the other hand, the dead time adjustment circuit 5 includes a timer circuit 5g that measures time by being set in response to the OFF trigger signal Off_trg and outputs a [H] level timeout signal after counting the largest dead time (for example, 20 μs). The timer circuit 5g continues the time measuring operation unless it is reset in response to the ON trigger signal On_trg during the timing operation period. The output of the timer circuit 5g is logically added to the output of the delay circuit 5f via an OR circuit 5h and is input to the set terminal of a flip-flop 5i.

The flip-flop 5i is reset according to the ON trigger signal On_trg and is set according to the output of the timer circuit 5g or the output of the delay circuit 5f and performs a role of being set to indicate that the turn-on conditions of the switching elements Q1 and Q2 are satisfied. Thus, the flip-flop 5i is set when the output from the delay circuit 5f is applied before the timer circuit 5g counts the largest dead time.

A next-stage flip-flop 5j that is set according to the set output of the flip-flop 5i is a reset-set flip-flop and is reset according to the output of a one-shot circuit 5k that is driven according to the OFF trigger signal Off_trg. The one-shot circuit 5k outputs a pulse signal of a smallest time width (for example, 300 ns) that regulates the dead time Tdead from the input timing of the OFF trigger signal Off_trg, and performs a role of inhibiting the set operation of the flip-flop 5j by outputting the pulse signal.

As a result, the flip-flop 5j is set at the timing at which the output of the flip-flop 5i is received after the elapse of the smallest dead time Tdead from the input timing of the OFF trigger signal Off_trg. Thus, the set timing of the flip-flop 5j is regulated according to the output timing of the pulse signals P2L and P2H from the dV/dt detector 6 so as to be between the smallest time width (for example, 300 ns) and the largest time width (for example, 20 μs).

When the flip-flop 5j is set, a one-shot circuit 5m is activated in response to the output of the flip-flop 5j whereby a signal of a predetermined pulse width is generated. The signal output by the one-shot circuit 5m is delayed by a predetermined delay period Delay2 by a delay circuit 5n and is output as the ON trigger signal On_trg.

Therefore, according to the dead time adjustment circuit 5 having such a configuration, basically, in the heavy load state, the ON trigger signal On_trg is output at the timing passing the dead time Tdead of the smallest time width (for example, 300 ns) later than the input timing of the OFF trigger signal Off_trg. Moreover, in the light load state, the ON trigger signal On_trg is output at the timing passing the dead time Tdead of the largest time width (for example, 20 μs) later than the input timing of the ON trigger signal On_trg. Further, in a normal operation state, the ON trigger signal On_trg is output at the timing after the elapse of the time (that is, the dead time Tdead that is regulate to be between the smallest time width and the largest time width) regulated by the output timings of the pulse signals P2L and P2H that are detected by the dV/dt detector 6 and change according to the load.

In addition to the above-described configuration, the dead time adjustment circuit 5 operating in this manner includes an OR circuit 5q that is provided between the delay circuit 5f and the OR circuit 5h so as to logically add the output of the delay circuit 5f and the output of the disable control circuit 7 (specifically the output of the D-type flip-flop 7b). The OR circuit 5q performs a role of maintaining the signal applied to the OR circuit 5h forcibly at the [H] level regardless of the output timings of the pulse signals P2L and P2H that are detected by the dV/dt detector 6 and change according to the load. That is, the pulse signals P2L and P2H are disabled.

As a result, the flip-flop 5i is always in the set state. Moreover, as described above, the flip-flop 5j is reset in response to the output of the one-shot circuit 5k and is set in response to the output of the flip-flop 5i at the falling timing of the output of the one-shot circuit 5k. As a result, the flip-flop 5j is always set at the timing generated after the elapse of the smallest dead time Tdead regulated by the one-shot circuit 5k from the input timing of the OFF trigger signal Off_trg to activate the one-shot circuit 5m and generates the ON trigger signal On_trg.

Therefore, according to the switching power source device having the above-described configuration can maintain a normal switching operation even when it is used for the heavy load purpose even in a state where the auxiliary coil T2 of the insulation transformer T is eliminated to simplify the structure of the insulation transformer T and reduce the cost thereof, and the input of the coil voltage Vp2 to the dV/dt detector 6 is eliminated so that the input terminal VW of the dV/dt detector 6 is open. That is, the disable control circuit 7 can apply a disable signal to the dead time adjustment circuit 5 to forcibly disable the dead time adjustment function and to forcibly set the dead time Tdead to the smallest width.

As a result, the dead time adjustment circuit 5 will not erroneously detects that the load is light based on a phenomenon that the outputs P2H and P2L of the dV/dt detector 6 are not output. Moreover, the turn-on timing of the switching elements Q1 and Q2 can be regulated as the timing that occurs after the elapse of the smallest dead time Tdead. Therefore, it is possible to properly execute the switching operation corresponding to the heavy load state.

Moreover, the disable control circuit 7 detects a change in the detection terminal VW during the activation, and the voltage applied to the detection terminal VW becomes the voltage which is the internal power voltage VDD divided by the resistors R1 and R2 and is thus maintained to be lower than the reference voltage Ref2. Therefore, the first comparator 7a regulates that the coil voltage Vp2 is input and maintains its output at the [L] level. As a result, the D-type flip-flop 7b will not be set at the timing when the clock signal clk is applied from the second comparator 7c via the delay circuit 7d, and the D-type flip-flop 7b maintains its output at the [L] level.

Thus, in this case, the [H] level signal will not be applied forcibly from the D-type flip-flop 7b to the OR circuit 5q. Therefore, the dead time adjustment circuit 5 operates so as to perform its original basic function. That is, the dead time adjustment circuit 5 automatically adjusts the dead time Tdead according to the outputs P2H and P2L of the dV/dt detector 6 and optimally controls the turn-on timings of the switching elements Q1 and Q2.

Therefore, according to the above configuration, regardless of whether the coil voltage Vp2 is input to the input terminal VW of the dV/dt detector 6 or the input terminal VW remains open, it is possible to generate the ON trigger signal On_trg at the timing that occurs a predetermined dead time Tdead later than the input timing of the OFF trigger signal Off_trg and to control the switching elements Q1 and Q2 to be subjected to on/off-driving at the optimal timings.

The invention is not limited to the above embodiment. For example, the dead time adjustment circuit 5 may employ various circuits other than the above configuration, which have been proposed from the past. In this case, it is sufficient that the function of the dead time adjustment circuit automatically, adjusting the dead time is disabled according to the output of the disable control circuit 7 and the dead time Tdead is set to the smallest time.

Moreover, although in the embodiment, the switching power source device main body includes a resonance circuit that includes the leakage inductance of the insulation transformer T and the resonance capacitor Cr, a resonance inductance may be connected in series to the primary coil T1 of the insulation transformer T. Further, the switching power source device main body may be applied to a synchronous rectification converter where the first switching element Q1 may be connected in series to a resonance inductance, the second switching element Q2 is connected to a connection point between the first switching element Q1 and the resonance inductance, and the electric power accumulated in the resonance inductance is transferred to the output side. In this case, an auxiliary coil may naturally be provided to the resonance inductance. Besides to this, the present invention can be modified in various ways without departing from the spirit of the present invention.

DESCRIPTION OF NUMERALS

Q1, Q2: SWITCHING ELEMENTS
T: TRANSFORMER
T2: AUXILIARY coil
Da, Db: RECTIFICATION DIODES
Ci: INPUT CAPACITOR
Co: OUTPUT CAPACITOR
Cr: RESONANCE CAPACITOR
1: ERROR DETECTOR
2: OSCILLATOR
3: CONTROL CIRCUIT
4: DRIVER CIRCUIT
5: DEAD TIME ADJUSTMENT CIRCUIT
6: dV/dt DETECTOR
7: DISABLE CONTROL CIRCUIT
7a, 7c: COMPARATOR
7b: D-TYPE FLIP-FLOP
7c: OUTPUT OF COMPARATOR
7d: DELAY CIRCUIT

What is claimed is:

1. A switching power source device comprising:
a resonance-type switching power source device main body which includes first and second switching elements that are connected in series and are alternately controlled to switch ON and OFF, and in which the first switching element switches an input voltage to accumulate electric power in an inductor, the second switching element is switched to transfer the electric power accumulated in the inductor to an output capacitor using resonance of the inductor to obtain output electric power;
a dead time adjustment circuit that generates an ON trigger signal that regulates an ON timing of one of the first and second switching elements after elapse of a predetermined dead time from an OFF timing of the other switching element, and the dead time adjustment circuit adjusts the dead time according to a temporal change of a terminal voltage input to an input terminal for detecting a change in a connection point voltage of the first and second switching elements; and
a disable control circuit that detects the temporal change of the terminal voltage during activation and disables a function of the dead time adjustment circuit adjusting the dead time when the terminal voltage does not temporally change.

2. The switching power source device according to claim 1, wherein the resonance-type switching power source device main body has a configuration in which the first switching element is connected in series to a primary coil of an insulation transformer and the second switching element is connected in parallel to the primary coil of the insulation transformer, and
the terminal voltage input to the input terminal is a voltage generated in an auxiliary coil of the insulation transformer.

3. The switching power source device according to claim 1, wherein the terminal voltage during the activation is detected as a voltage before the first and second switching elements starts a switching operation.

4. The switching power source device according to claim 1, wherein the disable control circuit includes a comparator that compares the terminal voltage during the activation with a reference voltage generated based on an internal power voltage, and a flip-flop that maintains an output of the comparator to enable or disable an operation of adjusting the dead time.

* * * * *